United States Patent [19]
Lipo et al.

[11] Patent Number: 5,650,707
[45] Date of Patent: Jul. 22, 1997

[54] INVERTER-CONTROLLED INDUCTION MACHINE WITH AN EXTENDED SPEED RANGE

[75] Inventors: Thomas A. Lipo, Middleton; Mohamed Osama, Madison, both of Wis.

[73] Assignee: Electric Power Research Institute, Inc., Palo Alto, Calif.

[21] Appl. No.: 535,607

[22] Filed: Sep. 28, 1995

[51] Int. Cl.$^6$ .................................................. H02P 1/38
[52] U.S. Cl. ......................................... 318/773; 318/801
[58] Field of Search .................................. 318/773, 774, 318/777, 799, 768, 786, 800, 803, 772, 801; 310/198, 184

[56] References Cited

U.S. PATENT DOCUMENTS

| | | | |
|---|---|---|---|
| 4,296,344 | 10/1981 | Rabe | 310/184 |
| 4,349,772 | 9/1982 | Weiss | 318/799 |
| 4,467,257 | 8/1984 | Douthart et al. | 318/774 |
| 4,472,670 | 9/1984 | Stanley | 318/774 |
| 4,489,265 | 12/1984 | Kuznetsov | 318/773 |
| 4,623,829 | 11/1986 | Smith et al. | 318/786 |
| 4,644,242 | 2/1987 | Takata et al. | 318/773 |
| 5,402,053 | 3/1995 | Divan et al. | 318/768 |
| 5,414,339 | 5/1995 | Masaki et al. | 318/800 |
| 5,436,546 | 7/1995 | Trumpler et al. | 318/773 |

OTHER PUBLICATIONS

T.A. Lipo and Yue Li, "The CFM —A New Family of Electrical Machines", International Power Electronics Conference, Apr. 3–7, 1995, (9 pages).

*Primary Examiner*—John W. Cabeca
*Attorney, Agent, or Firm*—Leonard Bloom

[57] ABSTRACT

A four pole induction machine with an extended speed range includes a stator with six independent stator coil groups (a pair of said coil groups constitutes a stator phase winding) and two current regulated inverters. Each of the inverters supplies currents to three said stator coil groups belonging to three different phases. The induction machine is operated in two operation modes: as a four pole machine, when both inverters supply currents of identical polarity, and as a two pole machine, when the polarity of currents supplied by one inverter is reversed in respect to the polarity of currents supplied by another inverter. The switching from the four pole operation mode to the two pole operation mode takes place during a constant power operation of the induction machine.

9 Claims, 12 Drawing Sheets

FIG. 11 ized by roughly a factor of two simply to enable it to reach four per unit speed in the field weakening range at rated power. Thus, it becomes apparent that machines designed for traction type applications become bulky as the constant horsepower speed range increases.

INVERTER-CONTROLLED INDUCTION MACHINE WITH AN EXTENDED SPEED RANGE

FIELD OF THE INVENTION

The present invention relates to a four pole induction machine, and more particularly, to a four pole induction machine wherein two inverters supply required regulated currents to three phase stator windings such that to obtain the effect of either four pole or two pole operational mode.

BACKGROUND OF THE INVENTION

Figure 1:
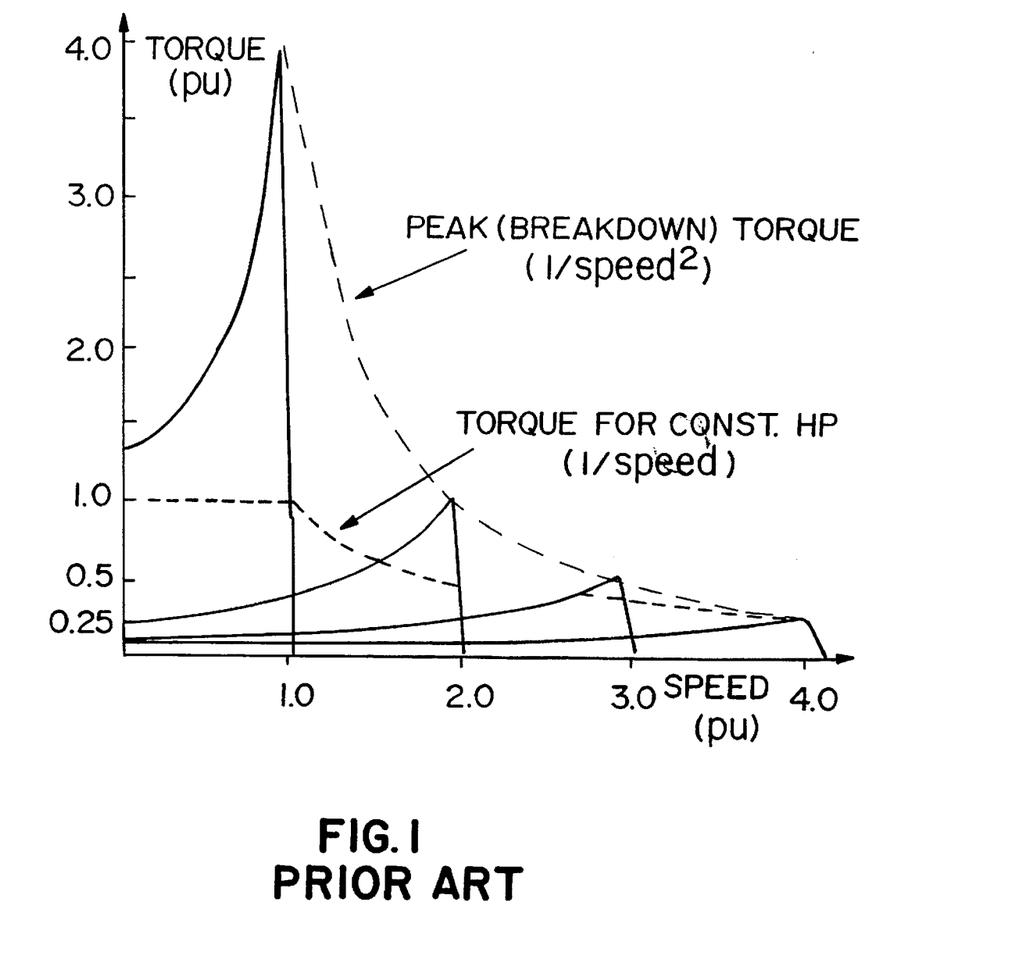
FIG. 1 shows diagrammatically torque-speed curves during constant horsepower operation of an induction machine of the prior art.

With the passing of zero emission vehicle legislation, electric vehicles are emerging as an important market for induction motor drives. A rather special requirement of electric vehicle drives is the desirability of operating the drive continuously within a constant horsepower over a very wide speed range corresponding to that of "steady driving" or "cruising". Hence, the issue of good efficiency during field weakened operation becomes one of paramount importance for electric vehicles. FIG. 1 shows a typical family of torque speed curves for variable frequency operation of an induction machine assuming that the inverter voltage becomes a constant amplitude above one per unit speed and that a four to one field weakening range is required. It is clear from the FIG. 1 that, since the torque varies as the square of the voltage, to reach a torque of 0.25 per unit at four time rated speed, the machine must be capable of 4 per unit torque at rated speed. Since machines of a typical design have only a 1.5 to 2.5 per unit breakdown torque, such a machine must be over In addition to simply over-sizing the machine, a wider speed range has previously been accomplished by various pole changing techniques involving contactor switching. The machine can be wound with two stator windings having a different pole number. When one winding is in use, the other is open circuited and vice versa.

Another scheme is the pole change winding, where a single winding is reconnected to obtain a two-to-one pole ratio. In addition to reversing certain coil groups, the reconnection might include changing the coil groups from series to parallel and the connections among the phases from Y to Δ or vice versa depending on the desired torque-speed characteristics.

Another previously suggested technique is pole amplitude modulation where pole numbers differing by ratios other than two are obtained by switching unsymmetrically distributed windings. In this case, the poor air gap MMF distribution makes this technique impractical except when efficiency is of no concern.

The speed range of an induction motor drive can also be extended by winding tap changing with contactors. For lower speed range all the winding turns are used while for operation at high speeds the tapped turns only are used.

The present invention is the further input in the art eliminating deficiencies of the prior art and allowing contactless pole changing technique to extend a speed range.

SUMMARY OF THE INVENTION

It is, therefore, an object of the present invention to provide a four pole induction machine with a wide speed range.

It is another object of the present invention to provide a control topology for a four pole induction machine which operates the latter in a four pole mode, and then continues operation in a two pole mode, thereby doubling the speed range of the four pole induction machine.

It is still an object of the present invention, to provide method for extending a speed range for a four pole induction machine by controlling the latter in a unique manner.

The principles of the present invention may find their particular utility as a technique for extending a speed range of a multi-pole (particularly four-pole) induction machines, comprising a rotor and a stator, wherein three phase stator windings are wound at the stator, and wherein a pair of stator coil groups constitutes each of said three phase stator windings. First and second inverters supplying currents to said stator coil groups, are provided, such that each of said first and second inverters supplies currents to three stator coil groups belonging to three different phases.

In accordance with the teachings of the present invention, a method for extending a speed range of the four pole induction machine comprises the steps of supplying currents of the same polarity from the first and the second inverters, thereby running the induction machine in a four pole operation mode, and switching the four pole operation mode to two pole operation mode by reversing the polarity of the currents supplied from one of said first and second inverters in respect to the polarity of another one of said first and second inverters.

Each of said first and second inverters includes three pairs of switches, each pair of the switches for controlling a respective one of said stator coil groups. Each of the stator coil groups has a first terminal and a second terminal. First terminals of each three stator coil groups belonging to three different phases are interconnected, and second terminals of each stator coil group are connected to a respective inverter leg of the respective inverter.

The switching of the four pole operation mode to the two pole operation mode takes place during a constant power operation of the induction machine in the two pole operation mode, which occurs at a speed of 3600 rpm if a base speed is 1800 rpm and a maximum speed of the induction machine is 7200 rpm.

Preferably, the first and the second inverters are current regulated inverters.

Viewing in another aspect, the present invention is a four pole induction machine with extended speed range, which combines performance advantages of four pole induction machines at low speeds and two pole induction machines at high speeds. This four pole (as designed) induction machine comprises a rotors, a stator, and two current regulated inverters. Three phase stator windings are wound at the stator, such that a pair of stator coil groups constitutes each of the three phase stator windings. Each of the inverters supplies currents to three stator coil groups belonging to three different phases. Preferably, each inverter includes three pairs of switches, each pair of switches for controlling a respective one of said stator coil groups. Each of said stator coil groups has a first terminal and a second terminal, such that first terminals of each three stator coil groups belonging to three different phases are interconnected, and second terminals of each stator coil group are connected to a respective inverter leg of a respective inverter. While both inverters supply currents of the same polarity to the coil groups, the induction machine operates in a four pole operation mode. When the polarity of currents supplied by one of the inverters is reversed in respect to the polarity of another one, the induction machine is switched from four pole operation mode to two pole operation mode.

Switching of the four pole operation mode to the two pole operation mode takes place during a constant power operation for the induction machine in the two pole operation mode. This means, that if a base speed of and a maximum speed of the induction machine are 1800 rpm and 7200 rpm, respectively, then the switching of the four pole operation mode to the two pole operation mode occurs at a speed of 3600 rpm.

These and other objects of the present invention will become apparent from a reading of the following specification taken in conjunction with the enclosed drawings.

DETAILED DESCRIPTION OF THE INVENTION

Figure 2:
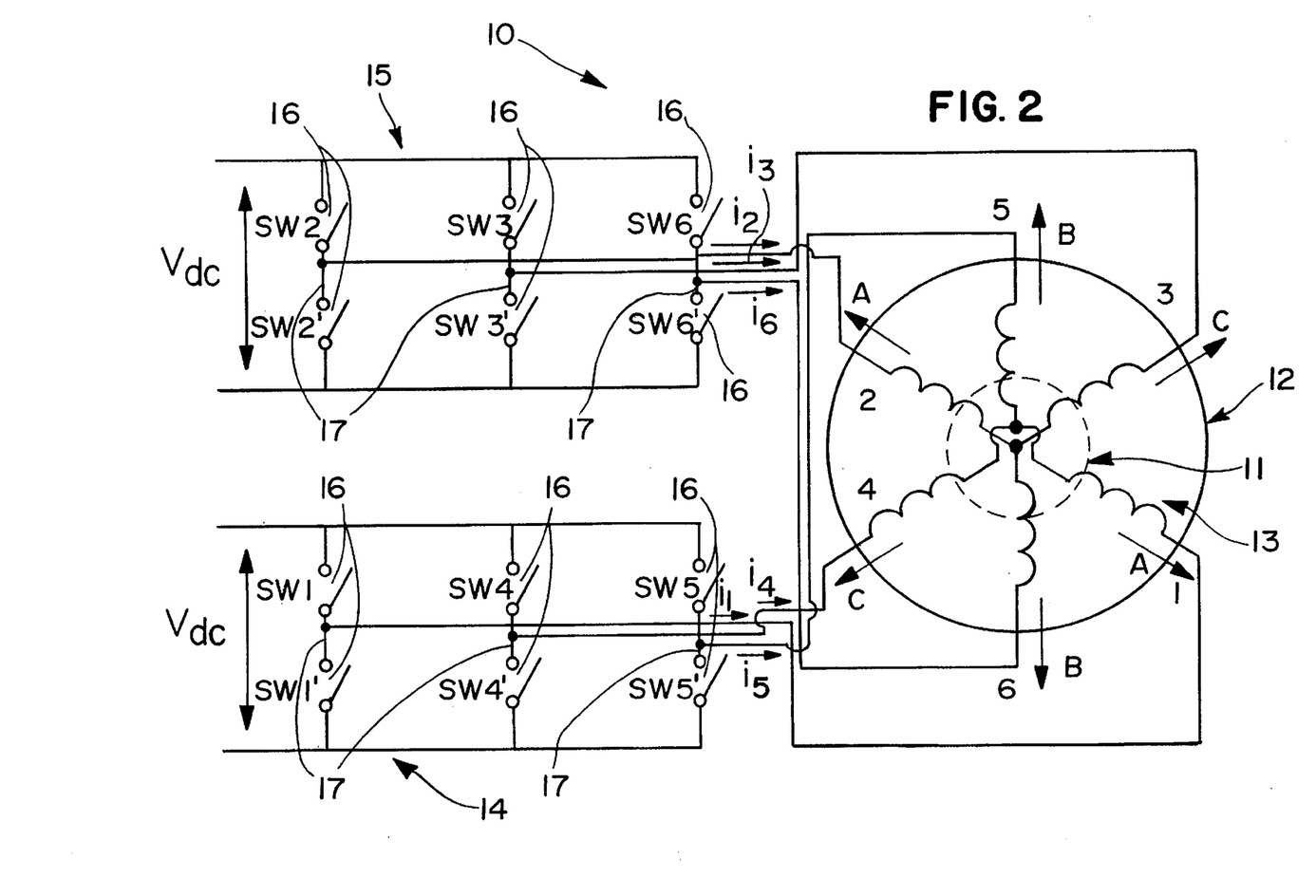
FIG. 2 shows a proposed drive topology of the induction machine of the present invention.
Figure 3:
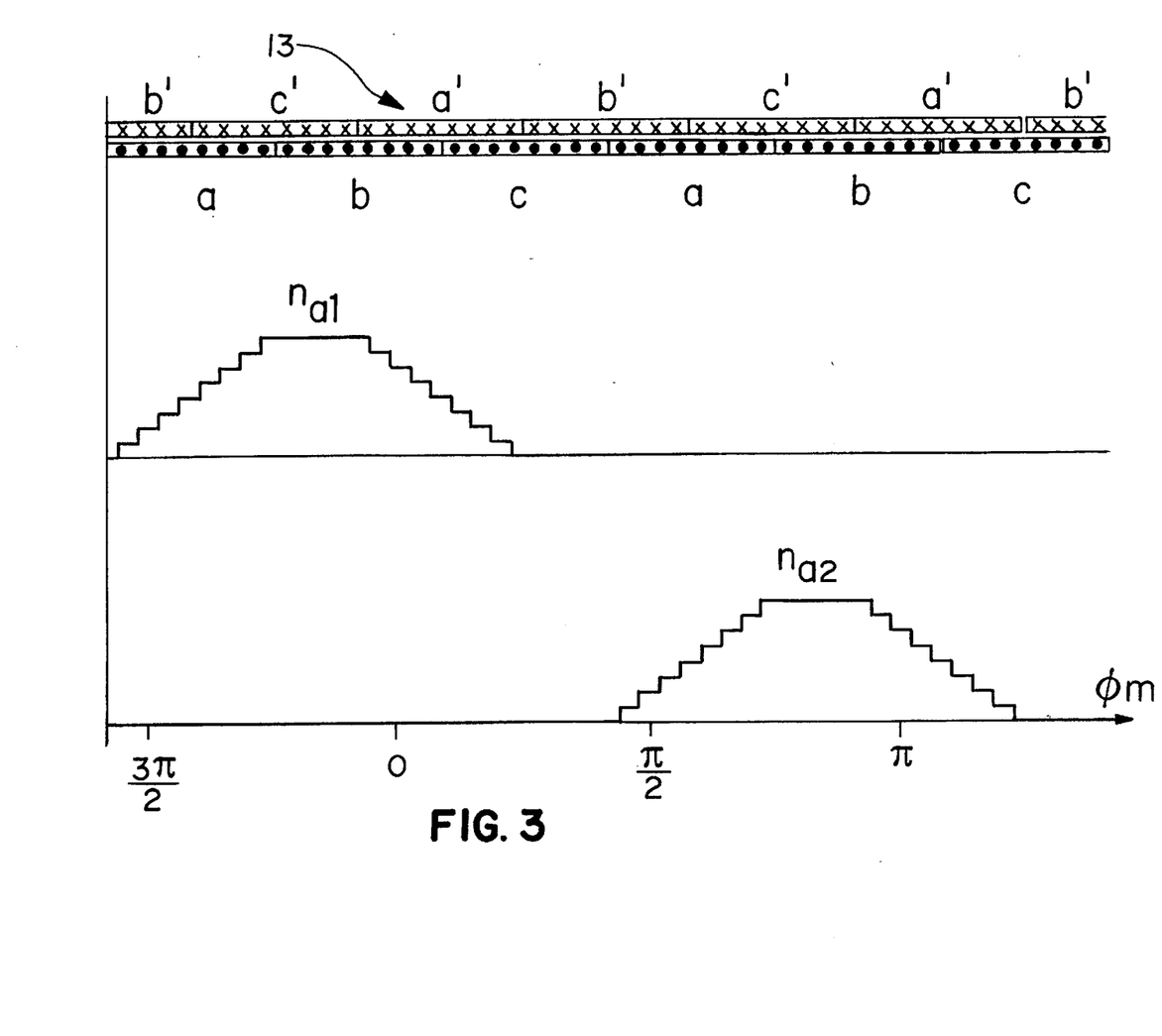
FIG. 3 shows diagrammatically a winding distribution and turns functions for a four pole machine with 120° phase belt according to the present invention.

Referring to FIGS. 2–11, a new contactorless pole changing technique is proposed to extend the field weakening range of four pole induction machine 10 having a rotor (schematically shown) 11 and a stator 12. The 48 slot stator winding 13, best shown in FIG. 3, is used to illustrate the operating principle of the present invention. The stator winding 13 includes three stator phase windings, as best shown in FIG. 2, directed to A, B, C phases of the induction machine 10. The winding distribution is a double layer 120° phase belt having two coil groups per phase.

Although, for the sake of simplicity, FIG. 2 shows six single coils 1–6, it will be appreciated by those skilled in the art, that the stator winding 13 consists of six coil groups 1–6, and further discussion will relate to stator coil groups.

Figure 4A:
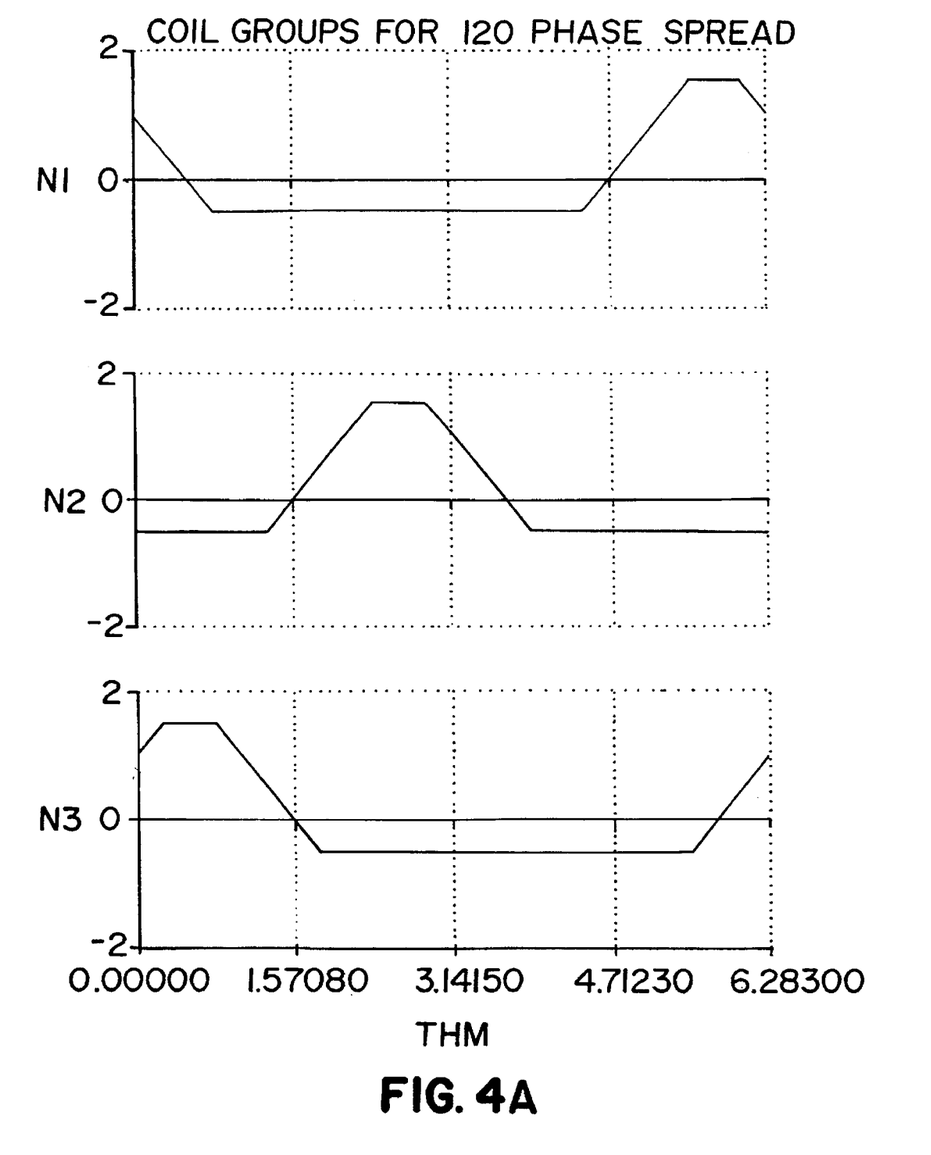
FIGS. 4A and 4B show diagrammatically winding functions for the six coil groups of the induction machine of the present invention.
Figure 4B:
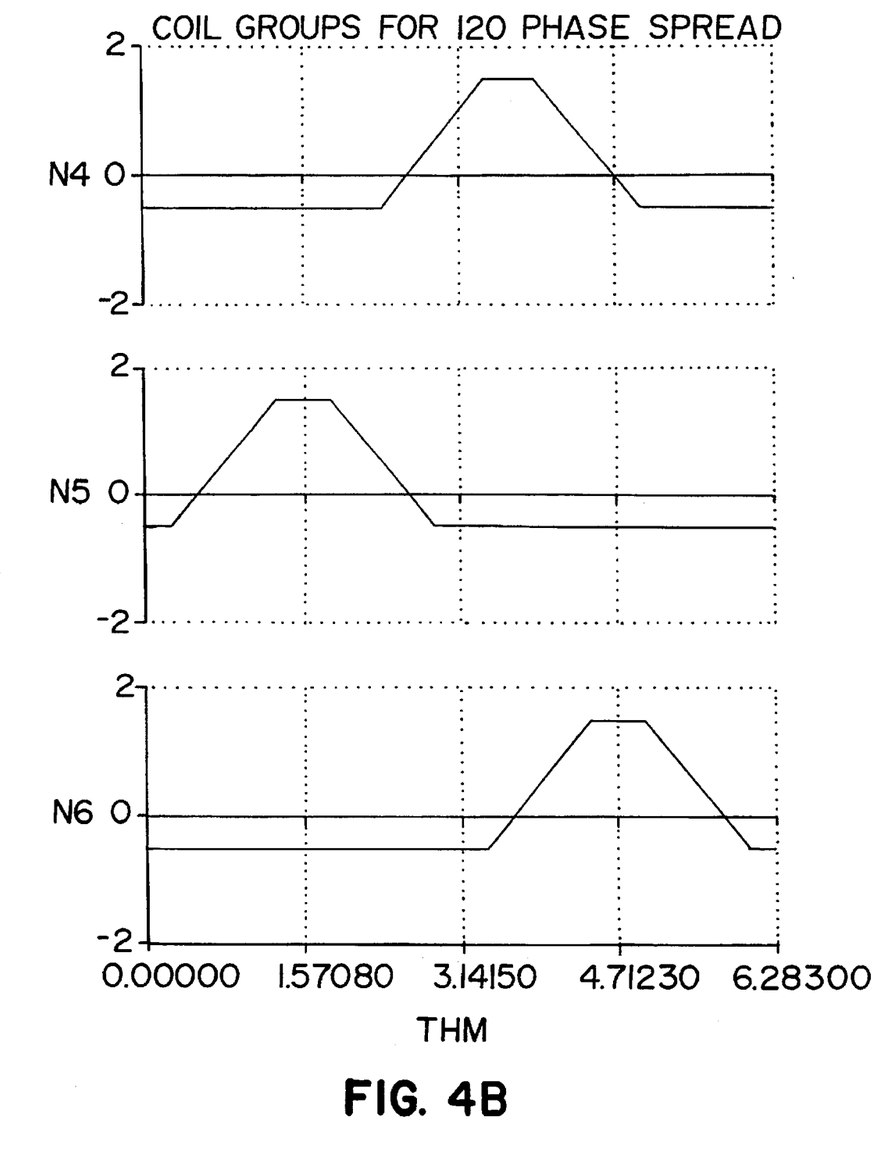
Figure 5:
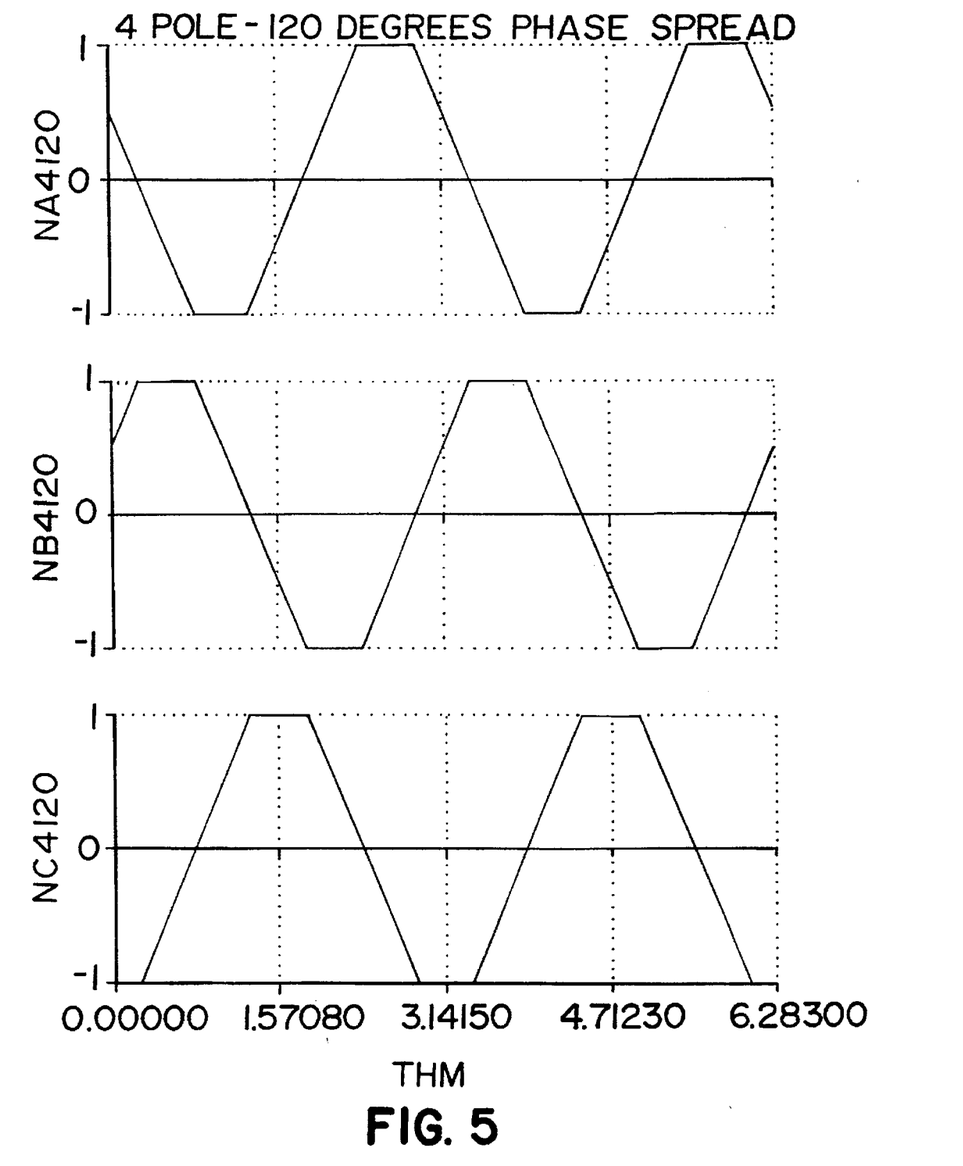
FIG. 5 shows diagrammatically normalized winding functions of the 2/4 pole induction machine for four pole mode operation.

Currents in each of the six stator coil groups (1, 2, 3, 4, 5, 6) are independent and thus their corresponding magneto-motive forces (MMFs) can be analyzed separately. Defining the winding function as the MMF spatial distribution for one ampere of current, the normalized winding function ($N_i$ ($\Phi_m$)) of each of the six coil groups (1, 2, 3, 4, 5, 6) can be plotted as shown in FIGS. 4A and 4B. To obtain a balanced four pole winding set, the three phase winding functions are defined as:

$$N_{a4}=N_1+N_2 \tag{1a}$$

$$N_{b4}=N_3+N_4 \tag{1b}$$

$$N_{c4}=N_5+N_6 \tag{1c}$$

as illustrated in FIG. 5.

Figure 6:
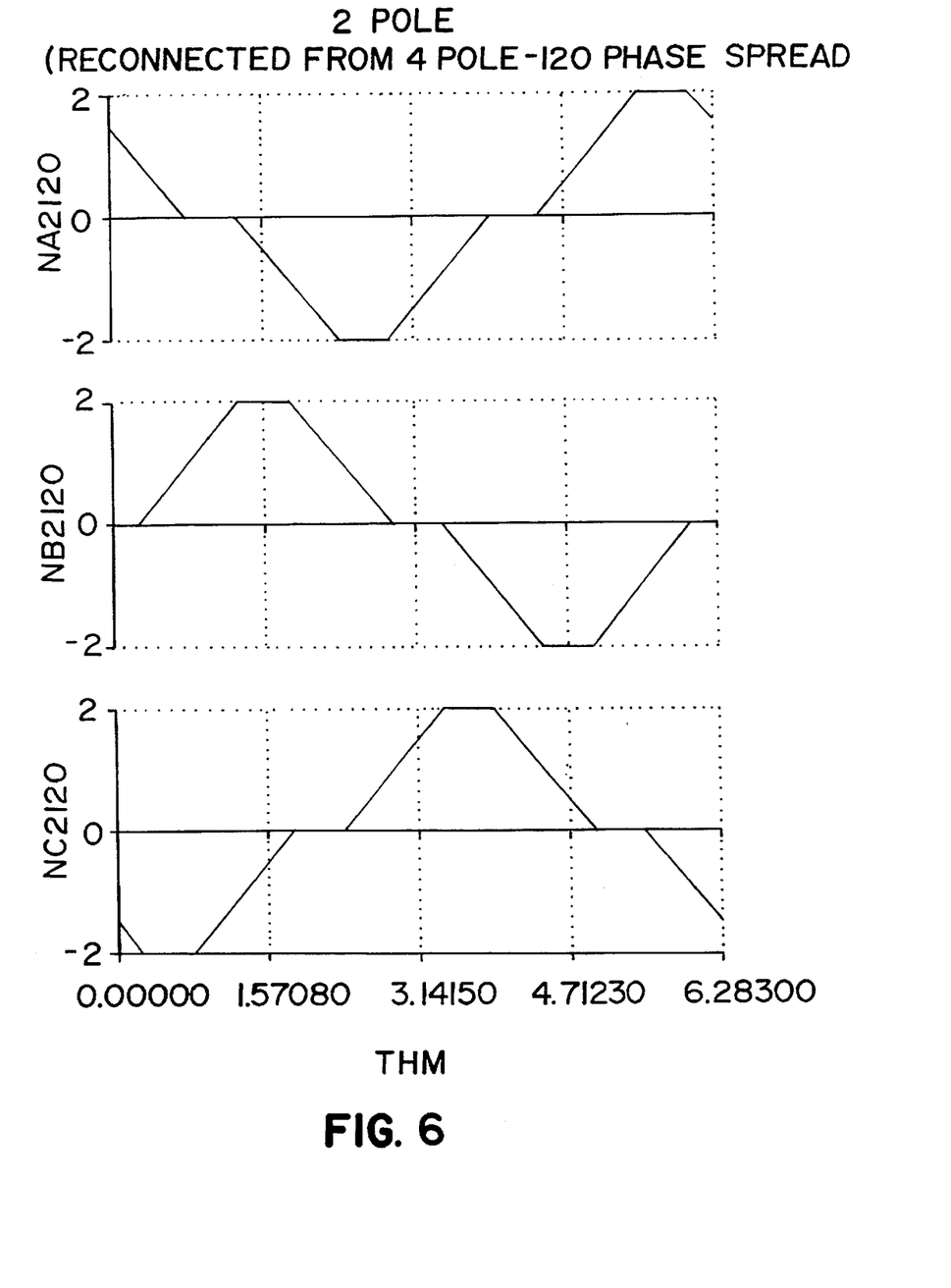
FIG. 6 shows diagrammatically normalized winding functions of the 2/4 pole induction machine for two pole mode operation.
Figure 7A:
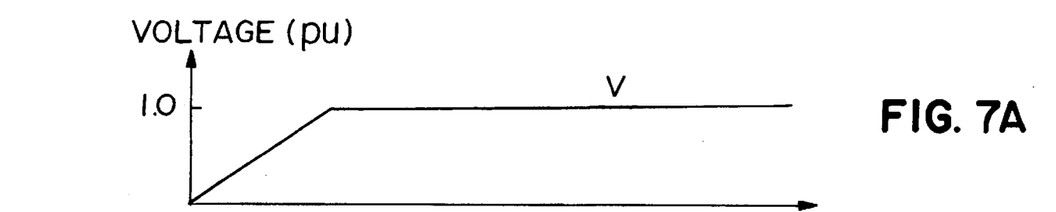
FIGS. 7A–7D show diagrammatically a voltage (FIG. 7A), air gap flux density (FIG. 7B), current and slip frequency (FIG. 7C), and torque and power (FIG. 7D) as a function of speed for 4:1 field weakening range.
Figure 7B:
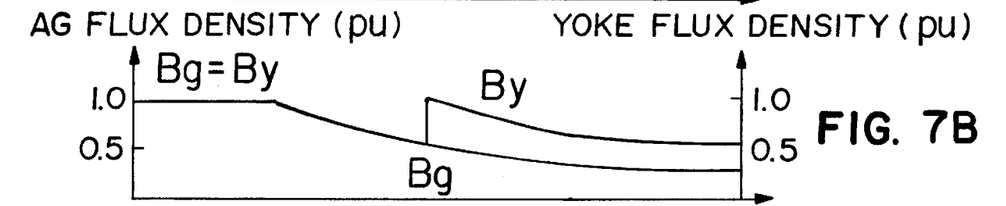
Figure 7C:
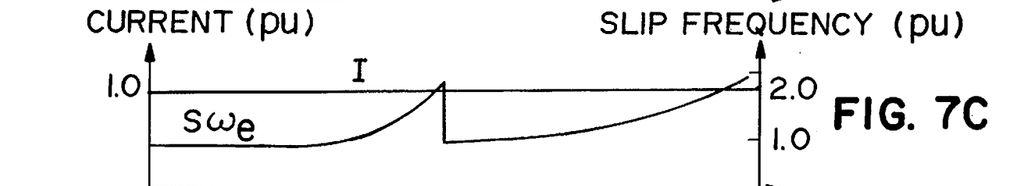
Figure 7D:
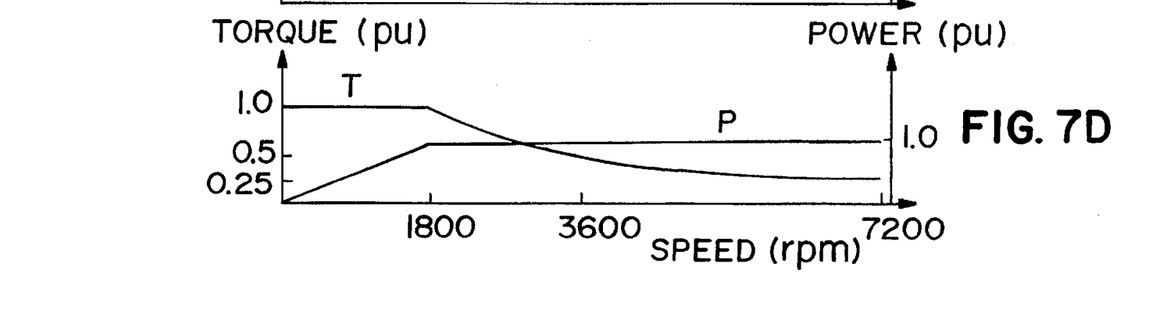

FIG. 6 shows that a balanced two pole winding set is obtained by defining the three phase winding functions as:

$$N_{a2}=N_1-N_2 \tag{2a}$$

$$N_{b2}=N_5-N_6 \tag{2b}$$

$$N_{c2}=N_4-N_3 \tag{2c}$$

$N_{a,b,c}$, (2 or 4) relates to A,B,C phase, respectively, of two pole or four pole machine 10.

The basic pole changing concept is to attain the desired MMF distribution of FIGS. 5 and 6 by reversing the necessary coil groups currents instead of reversing their connections (winding functions).

As best shown in FIG. 2, two inverters 14 and 15 are required to supply this six coil groups three phase machine 10, such that each inverter supplies three coil groups belonging to three different phases. Thus, the inverter 14 feeds coil groups 1, 4 and 5, while the inverter 15 supplies coil groups 2, 3 and 6. Both inverters 14, 15 are current regulated to force balanced sinusoidal currents of the desired amplitude and phase relationships and include switches 16 to control the machine 10.

As best shown in FIG. 2, each inverter includes three inverter legs 17 and three pairs of switches 16. Each pair of switches 16 includes respective upper and lower switches, such that the inverter 15 includes switches SW2–SW2', SW3–SW3' and SW6–SW6', and the inverter 14 includes switches SW1–SW1', SW4–SW4' and SW5–SW5'.

Each coil group (1–6) is connected to a respective inverter leg 17 of a respective inverter (14 or 15) and is controlled such that, for instance, the coil group 1 is connected to the inverter leg 17 of the inverter 14 and is controlled by switches SW1–SW1'.

The number of poles of the machine is "electronically" changed (from four to two) by merely reversing the direction (polarity) of the currents supplied from one inverter with respect to the currents from another one, as defined in TABLE 1. The inverters 14, 15 can be supplied with two isolated dc supplies as shown in FIG. 2, or a single dc bus can be used and the neutrals of the two three phase groups isolated.

TABLE I

| COIL GROUPS CURRENT REFERENCES ACCORDING TO MODE OF OPERATION | | | |
|---|---|---|---|
| | Ref. Current | 4 Pole Mode | 2 Pole Mode |
| Inverter 14 | $i_1^*$ | $i_a^*$ | $i_a^*$ |
| | $i_4^*$ | $i_b^*$ | $i_c^*$ |
| | $i_5^*$ | $i_c^*$ | $i_b^*$ |

TABLE I-continued

COIL GROUPS CURRENT REFERENCES
ACCORDING TO MODE OF OPERATION

|  | Ref. Current | 4 Pole Mode | 2 Pole Mode |
|---|---|---|---|
| Inverter 15 | $i_2^*$ | $i_a^*$ | $-i_a^*$ |
|  | $i_3^*$ | $i_b^*$ | $-i_c^*$ |
|  | $i_6^*$ | $i_c^*$ | $-i_b^*$ |

Although the same magnetic structure and electrical connections are maintained in both the 4 pole and 2 pole operation modes, the per phase equivalent circuit parameters and hence the machine 10 (motor) performance are different. The stator 12 and rotor 11 resistances are independent of mode of operation since the same stator winding and rotor cage are used.

Normally, a two pole (as designed) motor needs a yoke section twice that of a four pole (as designed) motor to allow the same air gap flux density. Thus for the same magnetic structure and yoke flux density, the air gap flux density for two pole operation mode is half that of four pole operation mode, while the air gap flux linkage is the same in both modes of operation. As a result, the stator and rotor teeth are expected to have higher saturation in four pole operation mode while core saturation is higher in two pole operation mode.

For the same speed, the supply frequency for two pole operation mode is half that of four pole operation mode, so the core losses would be less in the two pole operation mode provided that deep saturation is avoided.

Neglecting saturation and comparing the MMF distributions of FIGS. 5 and 6, it can be deduced that the magnetizing inductance for two pole operation mode is about 2.8 times that of four pole operation mode. The actual magnetizing inductance ratio is dependent on the operating point and hence the level and location of saturation.

The harmonic leakage inductance (due to MMF space harmonics) is higher for the two pole operation mode but the main leakage flux components (slot, end-winding and zigzag leakage) are independent of the operating mode. Thus the mode of operation has negligible effect on the machine leakage inductance.

The breakdown torque of an induction machine can be approximated as:

$$T_{pk} = \frac{3 V_s^2}{2\omega_{sm}\omega_{se} (L_{ls} + L_{lr})} \quad (3)$$

where:

$V_s$ rms fundamental stator phase voltage $\omega_{sm}$ rotor synchronous angular velocity (mech. rad./sec.)

$\omega_{se}$ supply angular frequency (elec. rad./sec.)

$L_{ls}$ stator leakage inductance $L_{lr}$ rotor leakage inductance (referred to stator)

From the equation (3), the breakdown torque for constant torque two pole operation mode is clearly one-half the "rated" breakdown torque for four pole operation mode. Thus, if constant power operation for the machine in two pole operation mode starts at 3600 rpm, the breakdown torque at 7200 rpm would be ⅛ the machine rated breakdown torque. Hence, a machine with 2 pu torque capability would have the breakdown torque and torque for constant horsepower intersect at 2 pu speed for four pole operation mode and 4 pu speed (7200 rpm) for two pole operation mode. Since the machine 10 has a four pole construction (as designed), the diameter of the rotor 11 is somewhat larger than for a conventional two pole machine (as designed) and thus has a lower mechanical limit on the rotor angular speed for the same maximum attainable peripheral speed. Therefore, the upper bound on speed may ultimately be of mechanical (not electrical) origin.

The following control strategy has been devised for implementing the present invention.

If a four to one field weakening range is required with a maximum speed of 7200 rpm, i.e. with a base speed of 1800 rpm, the proposed machine 10 with a 2/4 pole capability designed with only a conventional 2.0 per unit breakdown torque can be used. Below the base speed (60 Hz), the machine 10 is excited with four poles and the rated speed is obtained by conventional control (field oriented control, for example) so that the voltage increases linearly with supply frequency to keep the air gap and yoke flux density approximately constant (at their rated value). Both the current and the slip frequency are almost constant in this region of operation when the torque is held constant. This method of control is possible until the ac voltage reaches the maximum value available from the inverter. Above the base speed, the motor is operated at constant voltage and power, almost constant current and the slip frequency is increased to maintain the maximum value of output power approximately constant. The gap and yoke flux density decrease inversely with speed (field weakening). Such an almost constant power region continues until the motor reaches breakdown at its slip limit, which occurs approximately at 3600 rpm for a motor with 2 pu breakdown torque.

In two pole operation mode, the motor is capable of producing only one-half the air gap flux density as the four pole configuration if the yoke flux density is to remain constant and not result in deep saturation. The air gap flux density must be limited to 0.5 pu resulting in the motor torque never exceeding about one-half the rated value of the four pole case. Thus, if "electronic" pole changing is performed from four pole operation mode to two pole operation mode at 3600 rpm, the resultant motor characteristics will be as shown in FIGS. 7A-7D.

Overall, the proposed control strategy provides the following advantages:

(1) Constant power mode operation can now be extended to four per unit speed, even though the breakdown torque of the machine is two per unit. Taking into account the better winding factor of conventional design 60° phase belt machines, the size and weight of this new machine is expected to be roughly 60% the size and weight of a machine of conventional design used for the same purpose.

(2) Operation at rated torque is attainable until 1800 rpm. A comparable two pole (as designed) motor would require twice the yoke thickness if used for this task.

(3) The machine stator and rotor yokes are now fully utilized by having the flux density in the yoke jump back to it rated value to initiate a second field weakening region beyond 3600 rpm.

(4) The magnetizing inductance for two pole operation is roughly 2.8 times its value in the case of four pole operation mode. Hence, if pole changing occurs at 3600 rpm, the magnetizing current for two pole operation mode will be only 5/7 that of four pole operation to maintain the same air gap flux density at 3600 rpm resulting in a potential efficiency improvement as the transition is made at 3600 rpm.

(5) The motor is operated at a high efficiency over a wide speed range since four pole machines are, in general, more efficient than two pole machines at lower speed and less efficient at higher speeds.

Figure 8:
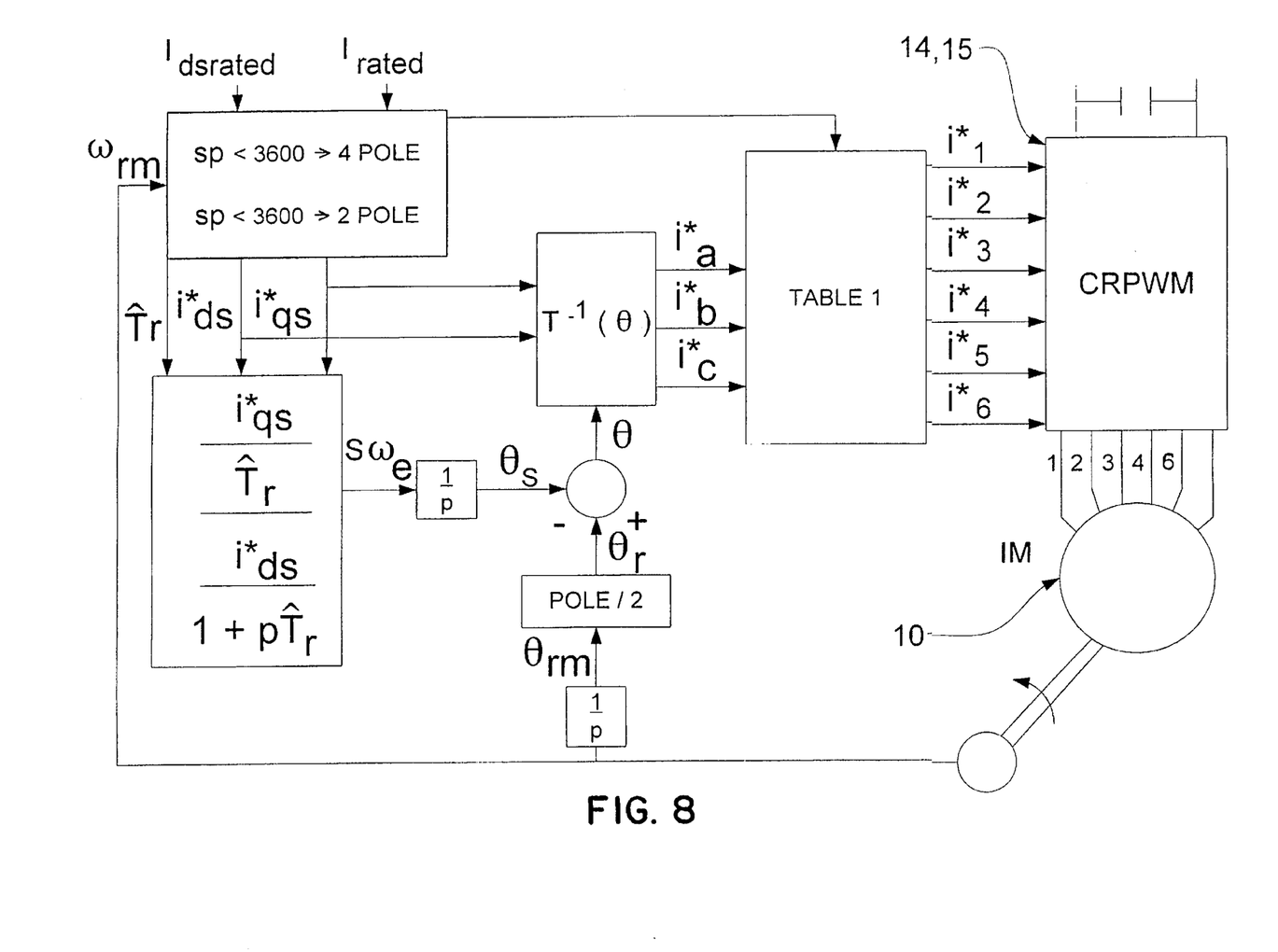
FIG. 8 shows schematically an induction machine drive with indirect field oriented control.

As best shown in FIG. 8, which illustrates a block diagram for the simulation model of the proposed induction machine drive with indirect field oriented control, the induction machine 10 is simulated in the actual physical (rather than the transformed d-q) variables using the multiple coupled circuit approach. To illustrate the torque and power capability of the induction machine drive, the current magnitude is fixed at its rated value ($I_{rated}$). The rated flux level (d-axis current $I_{dsrated}$) together with the speed feedback are used to determine the d and q axes reference currents ($I_{ds}$ and $I_{qs}$) and the estimate for the rotor time constant ($T_r$) needed for the field oriented controller.

Figure 9:
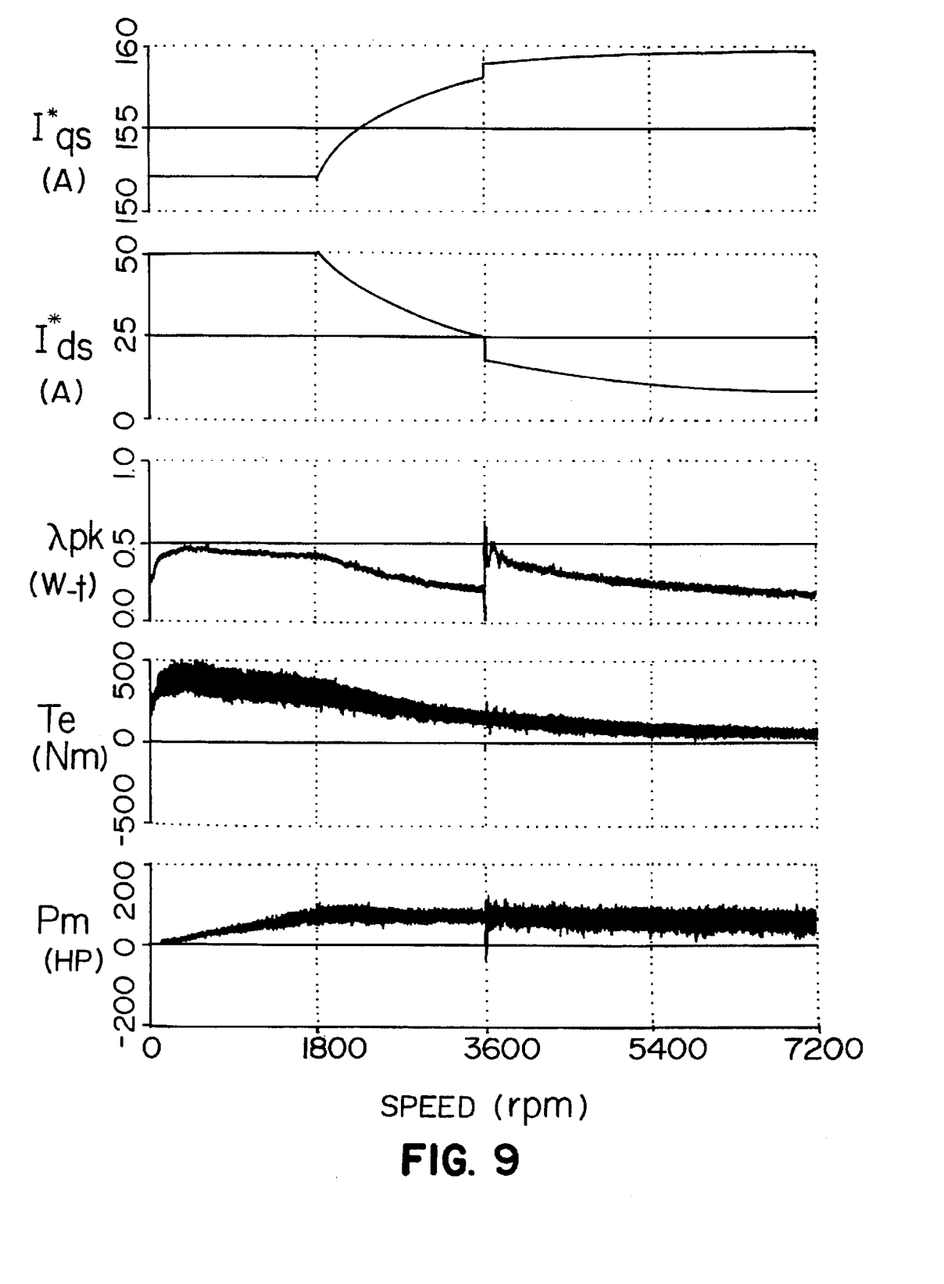
FIG. 9 shows diagrammatically simulation results for free acceleration of the drive topology of the present invention with indirect field oriented control.

FIG. 9 shows the simulation results for the free acceleration of a 100 HP machine with "electronic" pole changing at 3600 rpm. During pole switching, the d-axis current reference changes to restore the air gap flux linkage (yoke flux density) to its rated value to start a new field weakening range as explained earlier. With the exception of the transient during pole changing, the simulation results agree well with the proposed characteristics of FIGS. 7A–7D.

Figure 10:
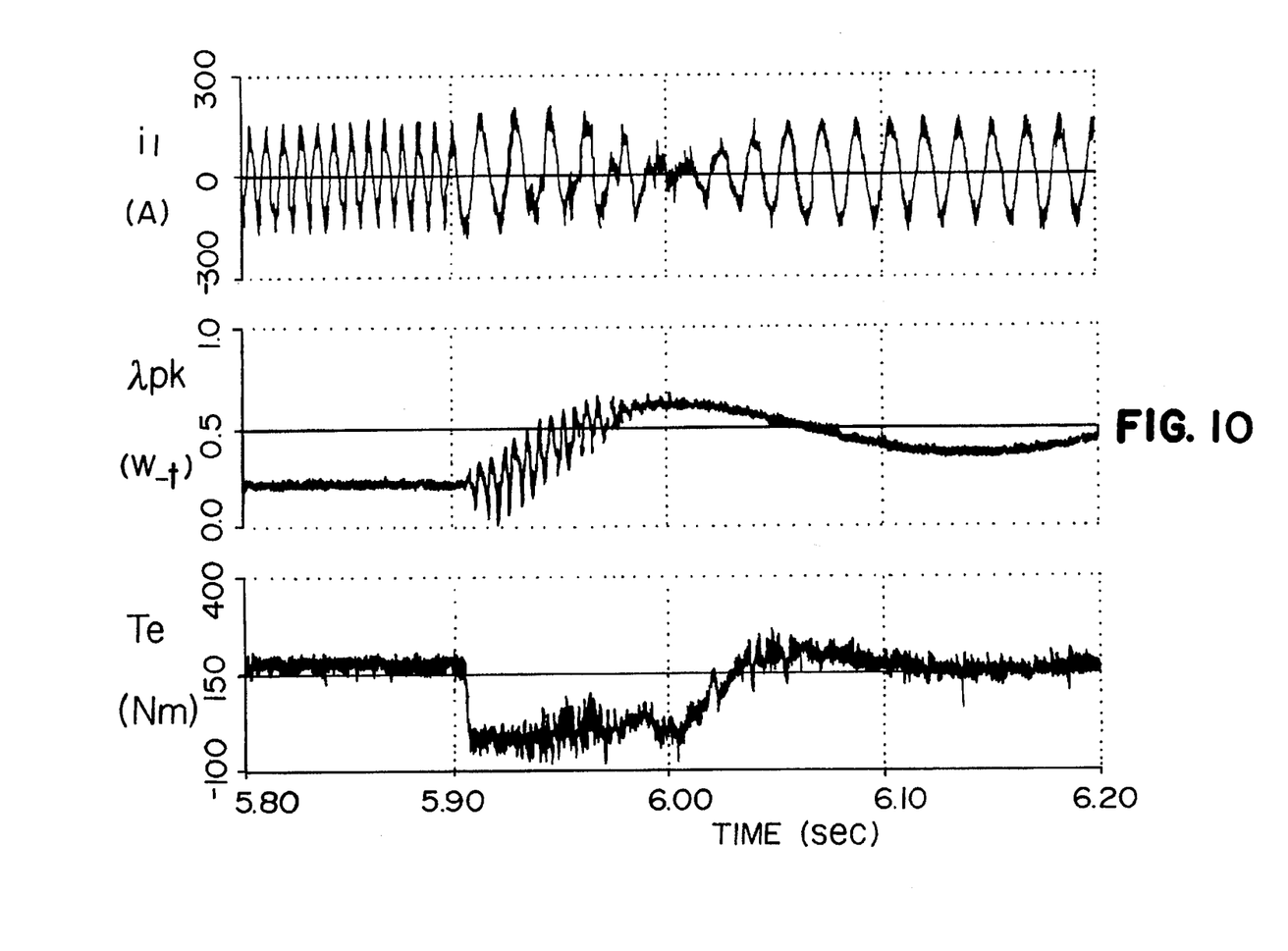
FIG. 10 shows diagrammatically simulation results for pole changing transient.

During pole-switching the air-gap field will consist of two portions: the decaying field of the outgoing pole number being sustained by the rotor currents, and the increasing field of the incoming pole number, being excited by the supply. FIG. 10 illustrates the switching transient, which lasts for about one rotor time constant. Though the torque drops from 200 Nm to −100 Nm there is minimal effect on speed due to the motor inertia.

Figure 11:
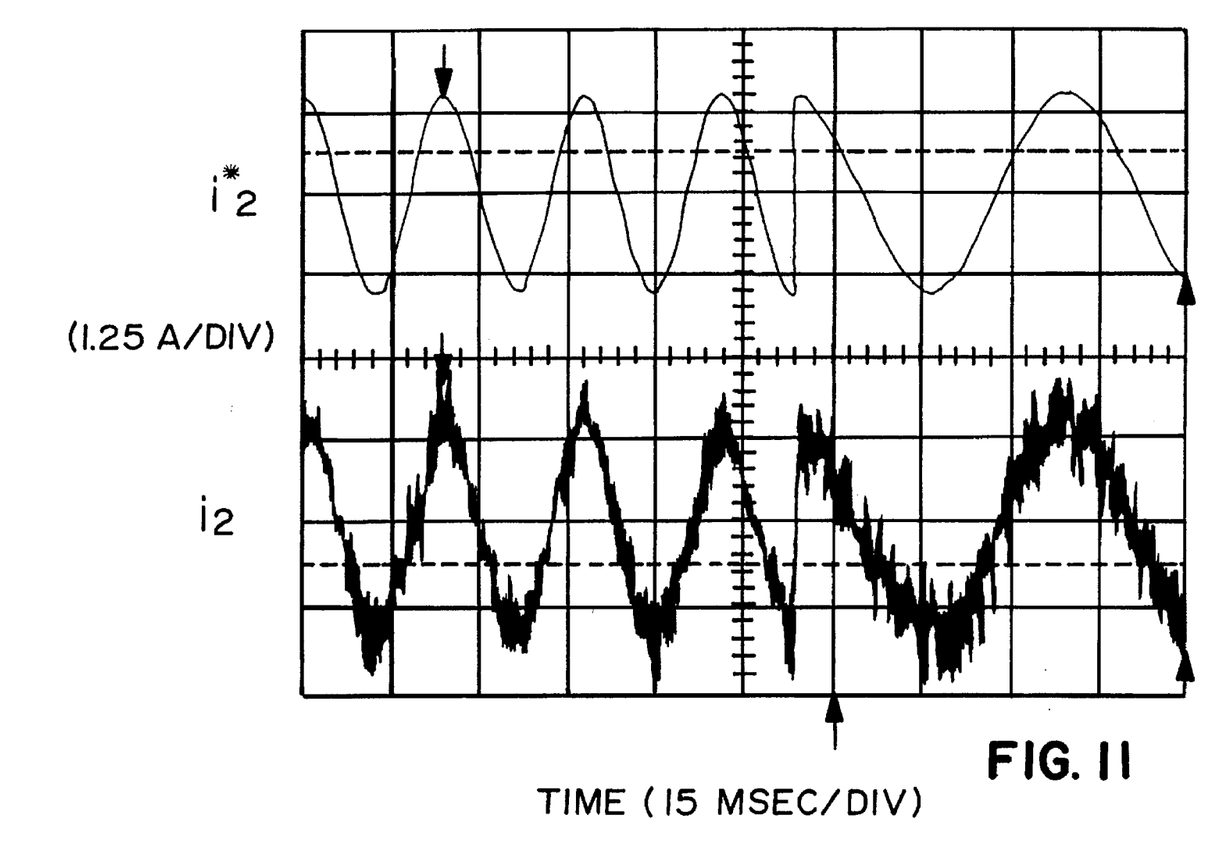
FIG. 11 shows diagrammatically experimental results for coil group 2 reference and actual currents during a pole changing transition.

The proposed pole changing scheme of the present invention, has been experimentally verified in the laboratory. The hardware circuit consisted of a 4 kW 36 slot 120° phase belt machine supplied from two MOSFET bridge inverters. FIG. 11 shows the coil group 2 reference and actual currents during a pole changing transition using, particularly, a hysteresis type current regulator.

It will be appreciated by those skilled in the art, that a control scheme to extend the speed range of four pole (as designed) induction machines has been proposed and verified. Continuous wide speed range can be attained with the following advantages over previous techniques. The machine is not over-sized and no special windings are added. There is no need for a switching device for winding change (such as a contactor) and no need for winding tapping.

On the other hand, there are several limitations introduced by this scheme including the requirement to access six leads of the machine. While the use of two inverters (each having half the rating of a conventional drive inverter) can be considered as a disadvantage, it should be mentioned that several electric vehicle applications already adopt a dual inverter approach for the purpose of improving reliability.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a four pole three phase induction machine, comprising a rotor and a stator, wherein three phase stator windings are wound at the stator, each of said phase stator windings being directed to a respective one of three phases of the induction machine, and wherein each of said three phase stator windings includes a pair of independent stator coil groups, a method for extending a speed range of the induction machine, comprising the steps of:

providing first and second inverters supplying currents to said stator coil groups, each of said first and second inverters supplying currents to three stator coil groups belonging to three different phases, supplying currents of the same polarity from the first and the second inverters, thereby running the induction machine in a four pole operation mode, and switching said four pole operation mode to two pole operation mode by reversing the polarity of the currents supplied from one of said first and second inverters in respect to the polarity of another one of said first and second inverters.

2. The method of claim 1, wherein each of said first and second inverters includes three pairs of switching means, each pair for controlling a respective one of said stator coil groups, wherein each of said stator coil groups has a first terminal and a second terminal, first terminals of each three stator coil groups belonging to three different phases being interconnected, and second terminals of each stator coil group being directly connected to a respective pair of the switching means.

3. The method of claim 1, wherein the step of switching the four pole operation mode to the two pole operation mode takes place during a constant power operation of the induction machine.

4. The method of claim 3, wherein a base speed of the induction machine is 1800 rpm, wherein a maximum speed of the induction machine is 7200 rpm, and wherein the switching of the four pole operation mode to the two pole operation mode occurs at a speed of 3600 rpm.

5. The method of claim 1, wherein the first and the second inverters are current regulated inverters.

6. A four pole three phase induction machine comprising:
a rotor,
a stator, and
a first inverter and a second inverter, wherein three phase stator windings are wound at the stator, each phase stator winding being directed to a respective one of the three phases of the induction machine, and wherein each of said three phase stator windings includes a pair of independent stator coil groups, wherein each of said first and second inverters supplies currents to three stator coil groups belonging to the three different phases of the induction machine, wherein each of said first and second inverters includes three pairs of switching means, each pair for controlling a respective one of said stator coil groups, wherein each of said stator coil groups has a first terminal and a second terminal, first terminals of each three stator coil groups belonging to three different phases being interconnected, and second terminals of each stator coil group being directly connected to a respective pair of the switching means, wherein said first and second inverters supply currents of the same polarity, thereby running the induction machine in a four pole operation mode, and wherein the polarity of currents supplied by one of said first and second inverters is reversed in respect to the polarity of another one of said first and second inverters, thereby switching said four pole operation mode to two pole operation mode.

7. The induction machine of claim 6, wherein switching the four pole operation mode to the two pole operation mode takes place during a constant power operation for the induction machine in the two pole operation mode.

8. The induction machine of claim 7, wherein a base speed of the induction machine is 1800 rpm, wherein a maximum speed of the induction machine is 7200 rpm, and wherein the switching of the fur pole operation mode to the two pole operation mode occurs at a speed of 3600 rpm.

9. The induction machine of claim 6, wherein the first and the second inverters are current regulated inverters.

* * * * *